July 26, 1932. W. R. OYSTON 1,868,846
SOUND REPRODUCING APPARATUS
Filed March 9, 1928 12 Sheets-Sheet 1

W. R. Oyston
INVENTOR

By Marks & Clerk
Attys.

July 26, 1932. W. R. OYSTON 1,868,846
SOUND REPRODUCING APPARATUS
Filed March 9, 1928 12 Sheets-Sheet 2

W. R. Oyston
INVENTOR

By Marks & Clark
Attys.

July 26, 1932. W. R. OYSTON 1,868,846
SOUND REPRODUCING APPARATUS
Filed March 9, 1928 12 Sheets-Sheet 3

W. R. Oyston
INVENTOR

By: Marks & Clark
ATTYS.

ly 26, 1932.  W. R. OYSTON  1,868,846
SOUND REPRODUCING APPARATUS
Filed March 9, 1928    12 Sheets-Sheet 4

W. R. Oyston
INVENTOR
By Marks & Clark
Attys.

July 26, 1932. W. R. OYSTON 1,868,846
SOUND REPRODUCING APPARATUS
Filed March 9, 1928   12 Sheets-Sheet 5

W. R. Oyston
INVENTOR

By: Marks & Clerk
ATTYS.

July 26, 1932.  W. R. OYSTON  1,868,846
SOUND REPRODUCING APPARATUS
Filed March 9, 1928   12 Sheets-Sheet 6

W. R. Oyston INVENTOR
BY Marks & Clark
Attys.

July 26, 1932.  W. R. OYSTON  1,868,846
SOUND REPRODUCING APPARATUS
Filed March 9, 1928    12 Sheets-Sheet 9
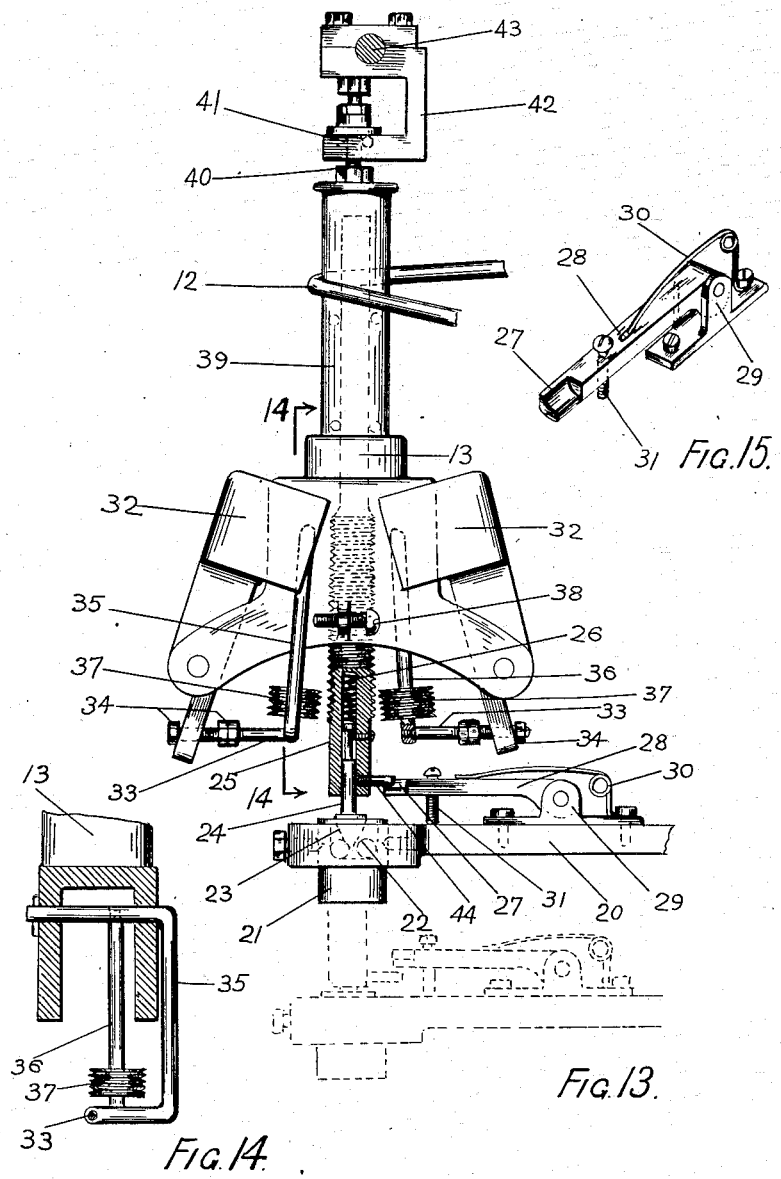
W. R. Oyston
INVENTOR
By: Marks & Clerk
ATTYS.

July 26, 1932.  W. R. OYSTON  1,868,846
SOUND REPRODUCING APPARATUS
Filed March 9, 1928   12 Sheets-Sheet 11
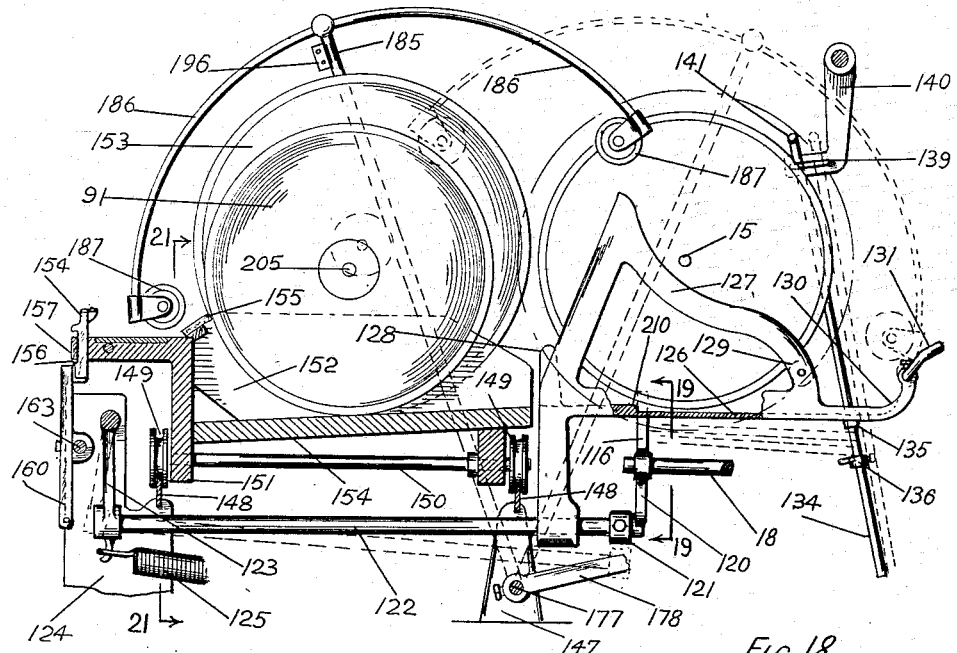
FIG. 18.
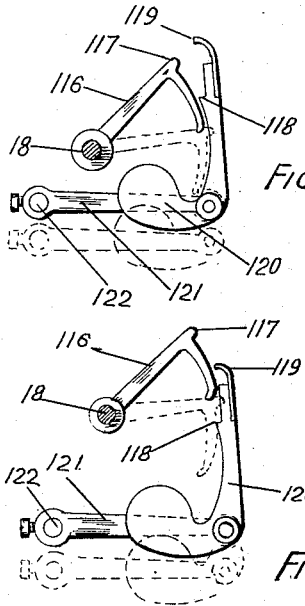
FIG. 19.
FIG. 20.
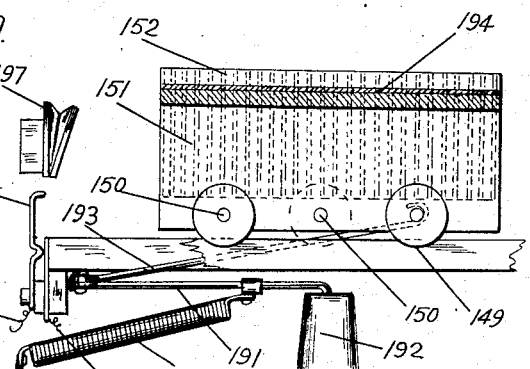
FIG. 21.
W. R. Oyston
INVENTOR
By: Marks & Clark
ATTYS.

July 26, 1932.  W. R. OYSTON  1,868,846
SOUND REPRODUCING APPARATUS
Filed March 9, 1928    12 Sheets-Sheet 12

W. R. Oyston
INVENTOR
By Marks & Clerk
ATTYS

Patented July 26, 1932

1,868,846

UNITED STATES PATENT OFFICE

WILLIAM ROBERT OYSTON, OF NORTH MELBOURNE, VICTORIA, AUSTRALIA, ASSIGNOR TO CONTINUOUS GRAMOPHONES LIMITED, OF LONDON, ENGLAND

SOUND REPRODUCING APPARATUS

Application filed March 9, 1928, Serial No. 260,378, and in Australia March 31, 1927.

This invention relates to sound reproducing apparatus and has relevance to apparatus whereby a series of records may be automatically fed and played in sequence thereon to provide a programme of records or a single record may be played thereon and the playing thereof repeated.

An embodiment of the invention is illustrated in the accompanying drawings in which:—

Figure 1:
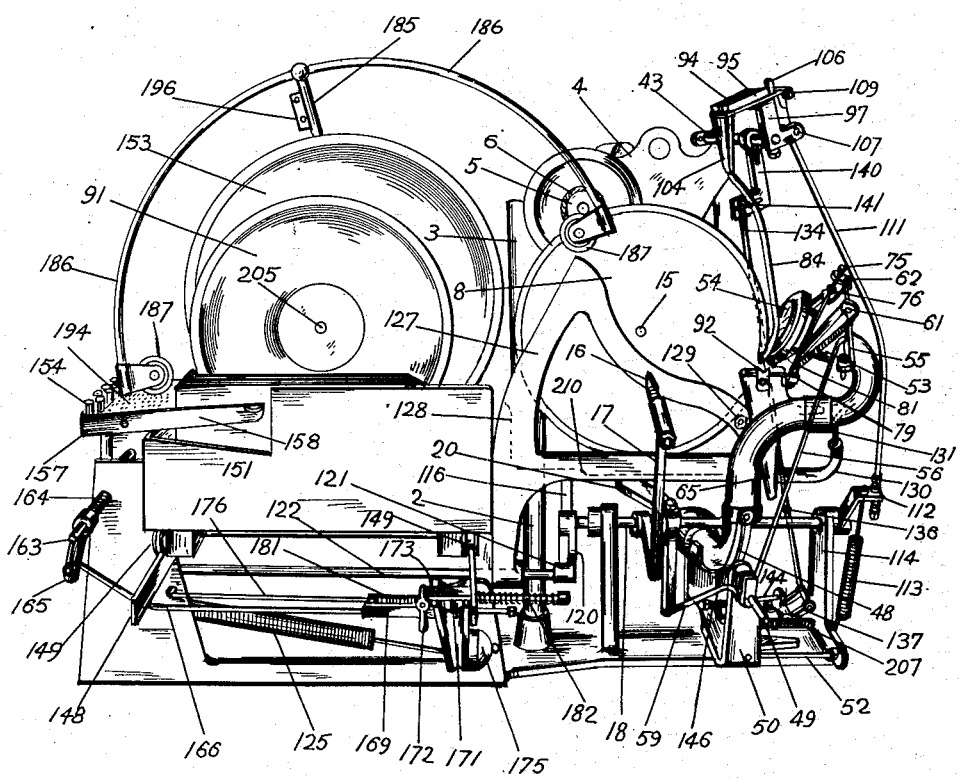

Fig. 1 is a front elevation of the apparatus removed from a cabinet and in non-playing position.

Figure 2:
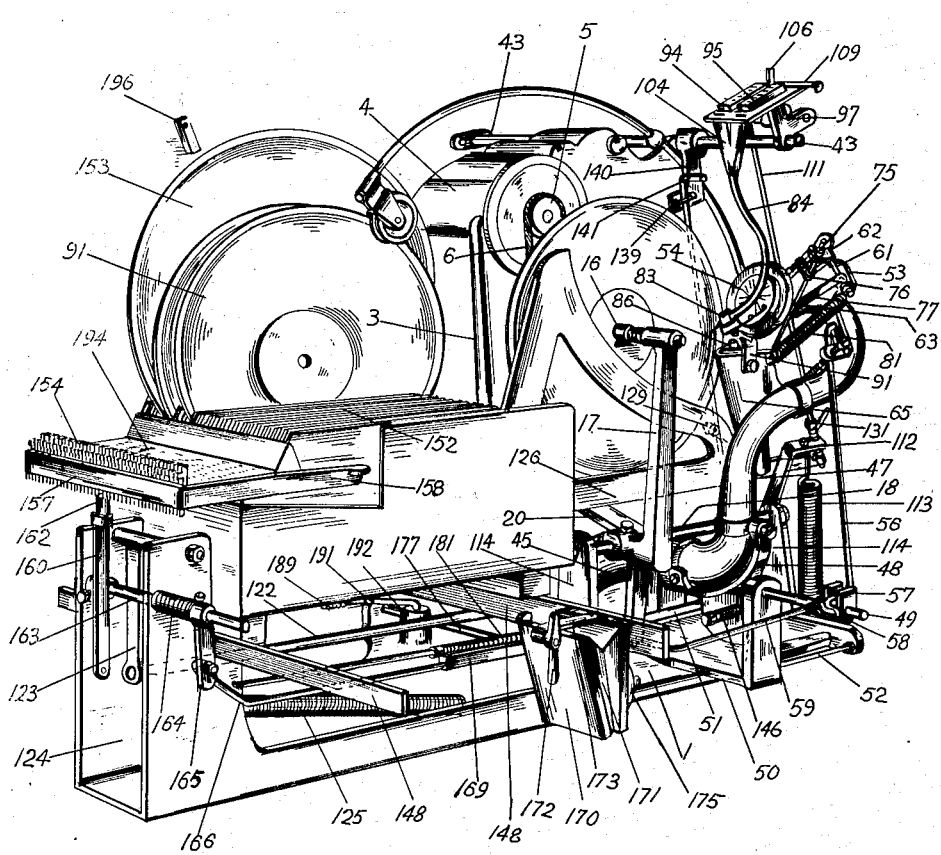

Fig. 2 a similar view but showing the apparatus in playing position.

Figure 3:
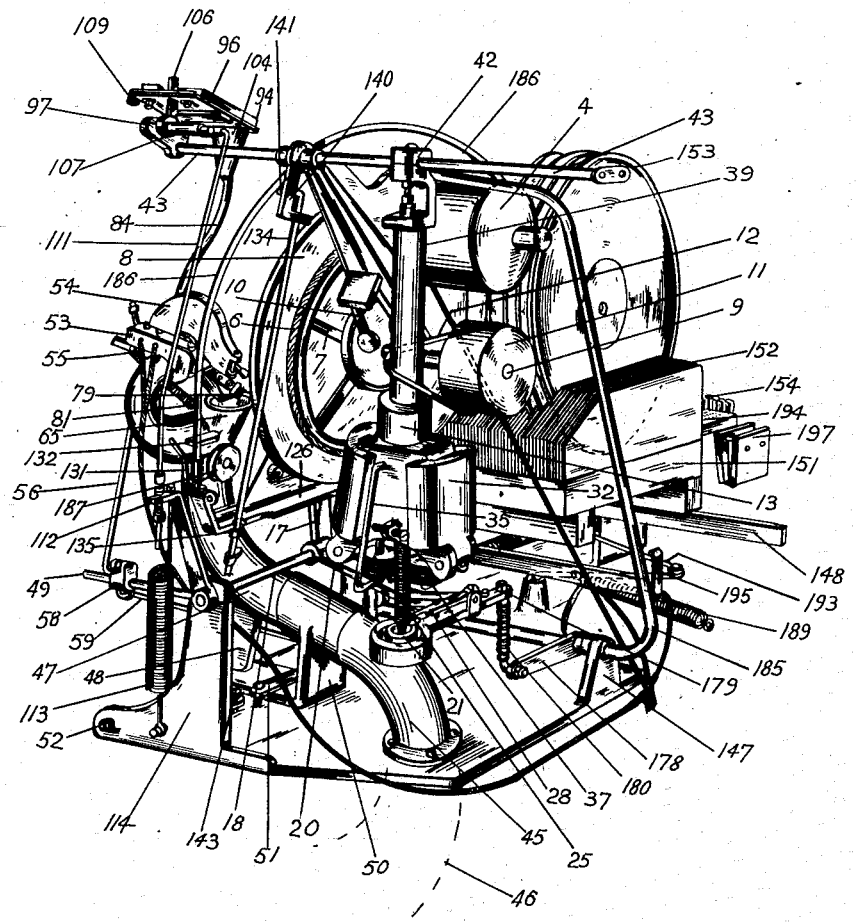

Fig. 3 a rearward perspective view.

Figure 4:
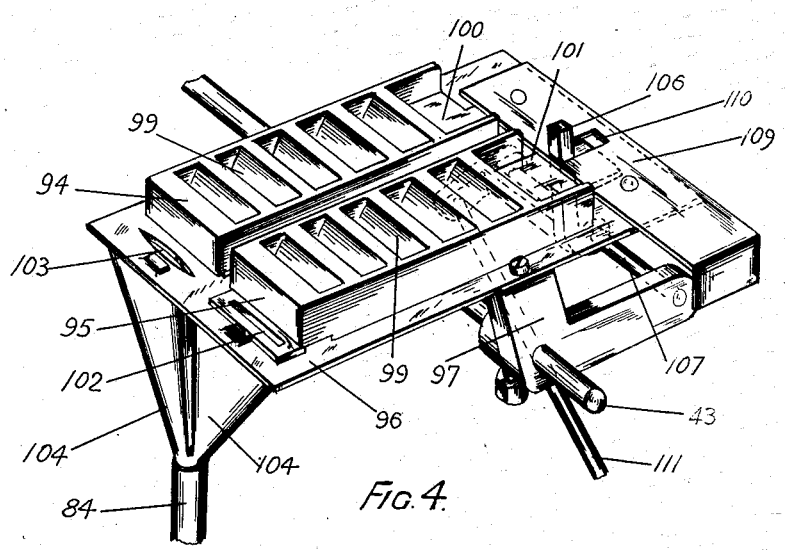

Fig. 4 a perspective view of a magazine for needles.

Figure 5:
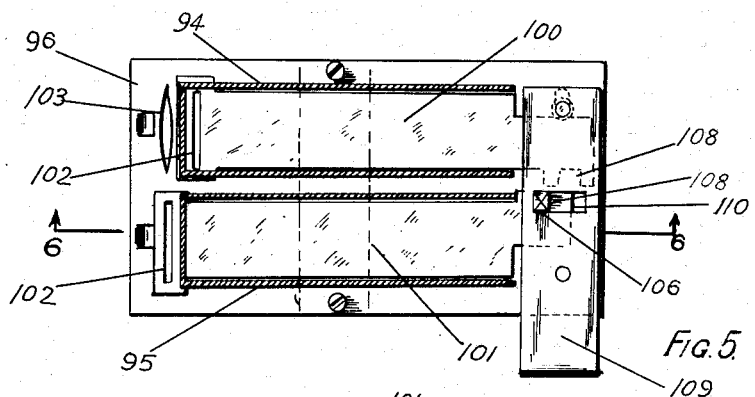

Fig. 5 a sectional plan thereof.

Figure 6:
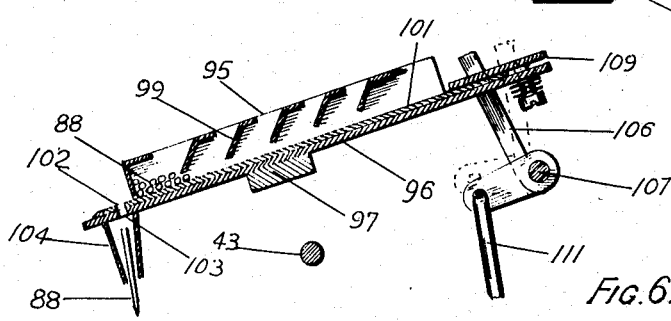

Fig. 6 a sectional elevation on line 6—6, Fig. 5.

Figure 7:
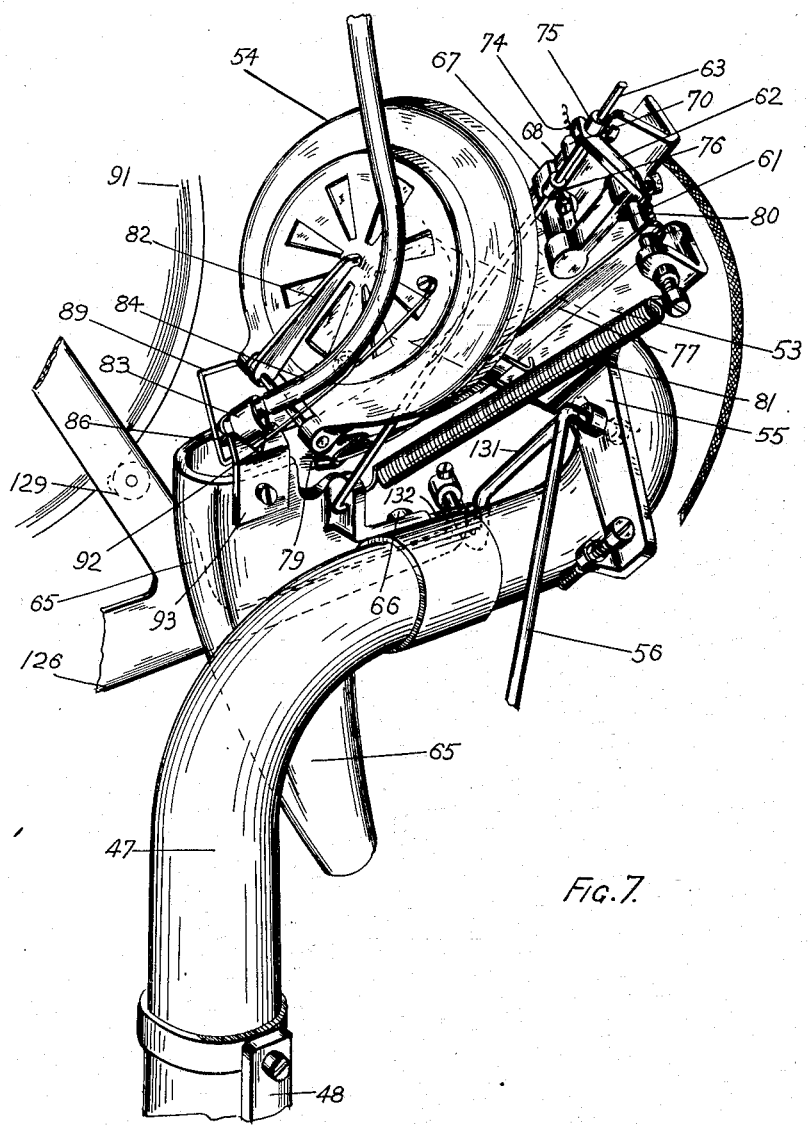

Fig. 7 an enlarged perspective view of the sound box and tone arm and connections thereto, with needle chute removed.

Figure 8:
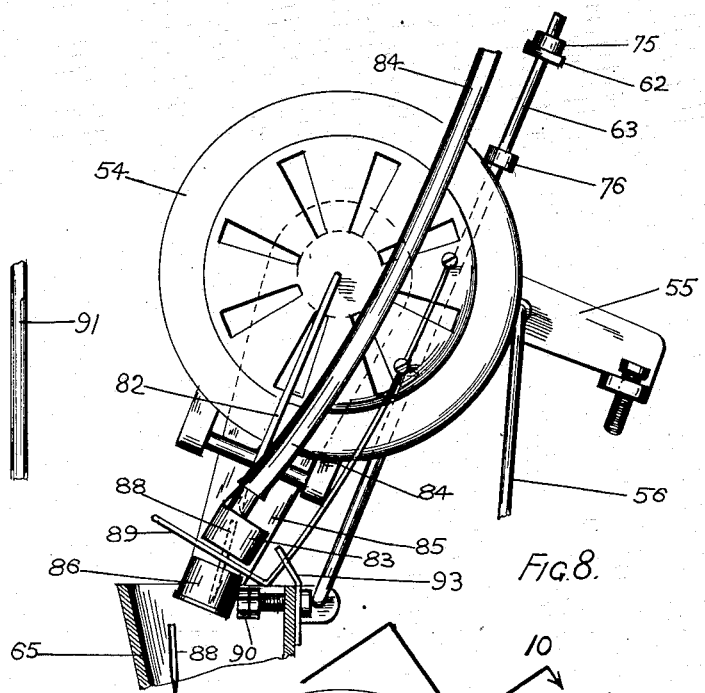
Figure 9:
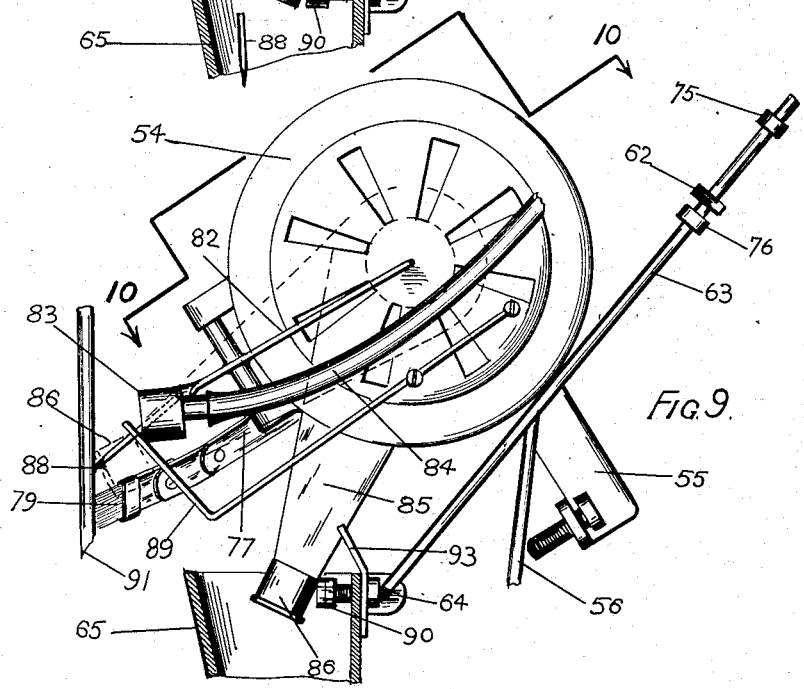

Figs. 8 and 9 are elevation views illustrating the sound box out of and in action respectively.

Figure 10:
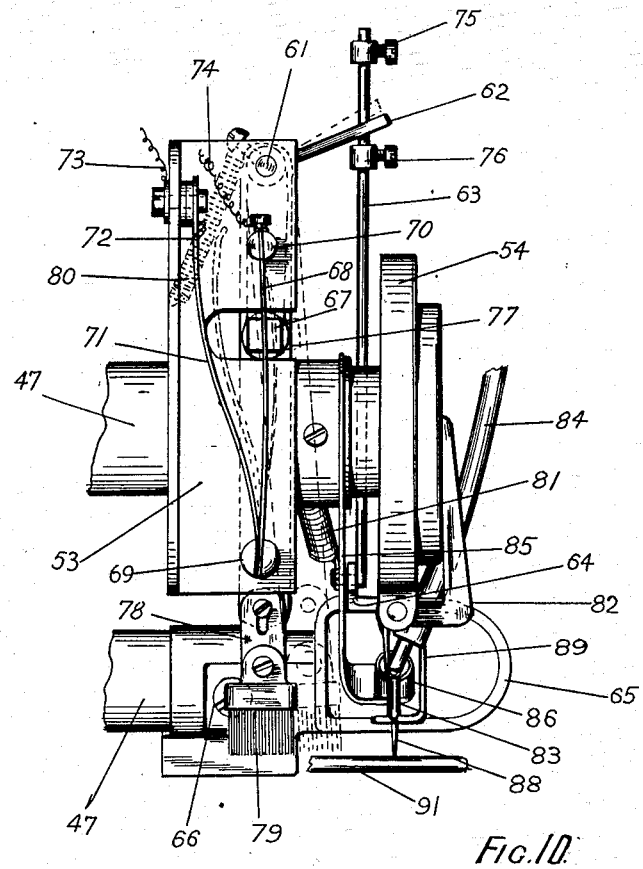

Fig. 10 a plan view on line 10—10, Fig. 9.

Figure 11:
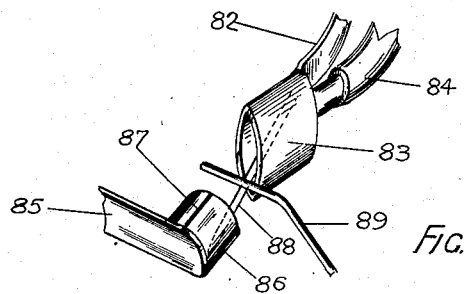

Fig. 11 a detail perspective view of needle holder.

Figure 12:
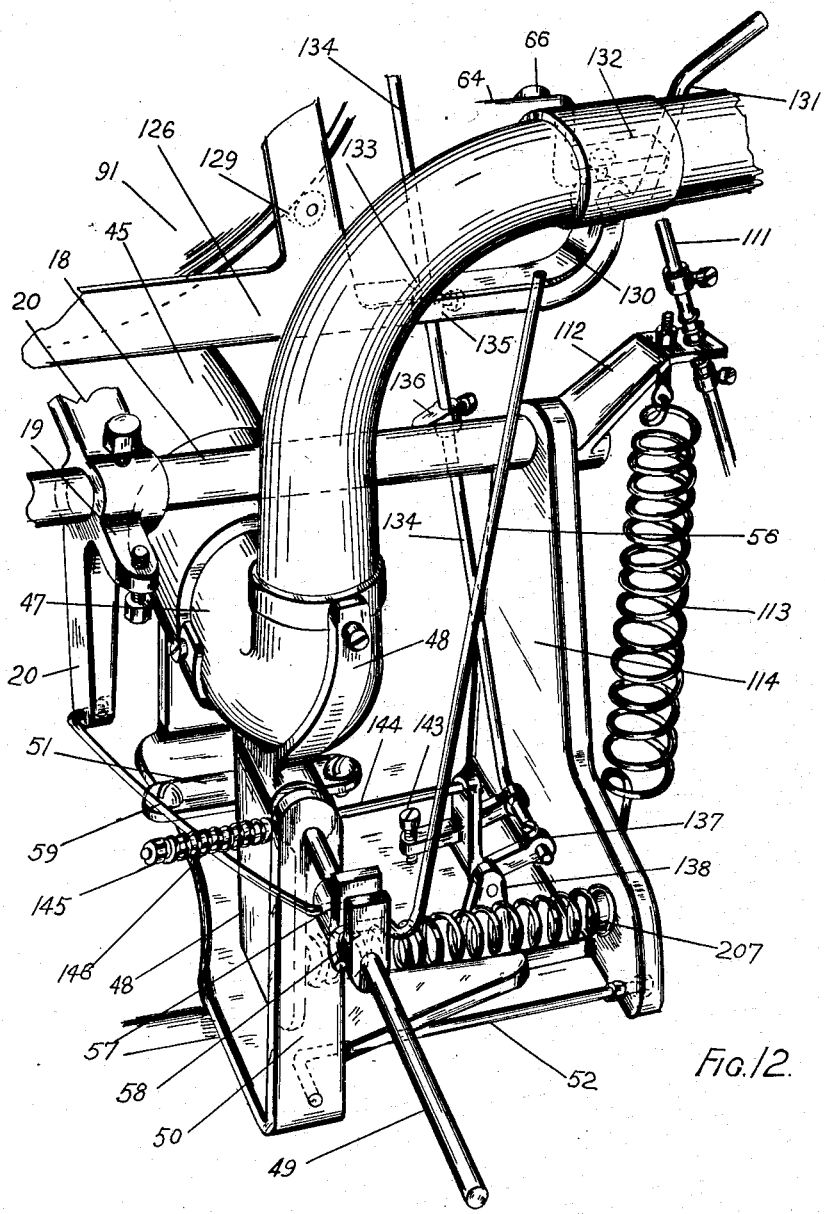

Fig. 12 an enlarged perspective view of the lower portion of the tone arm and connections thereto.

Fig. 13 an elevation of the governor mechanism for the apparatus.

Fig. 14 a sectional elevation on line 14—14, Fig. 13.

Fig. 15 a perspective view of brake means for the governor.

Figure 16:
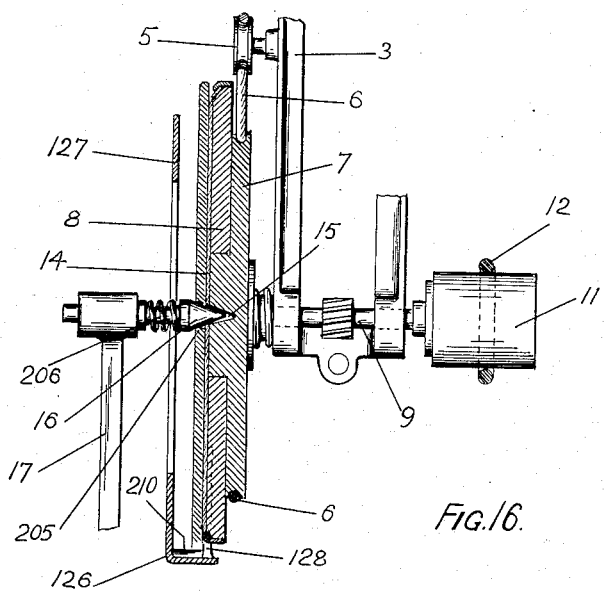

Fig. 16 a sectional elevation of turntable for records to be played.

Figure 17:
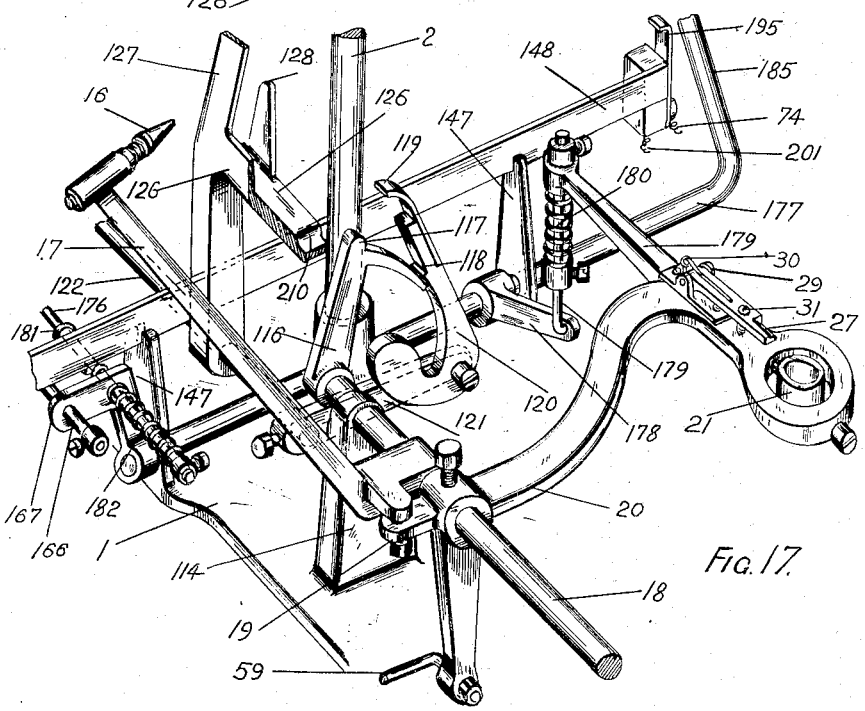

Fig. 17 an enlarged perspective view of a part of interlocking mechanism, adjoining the governor mechanism.

Fig. 18 a longitudinal sectional elevation illustrating the action of records when being placed in playing position.

Figs. 19 and 20 are detail views on line 19—19, Fig. 18.

Fig. 21 a sectional elevation on line 21—21, Fig. 18.

Figure 22:
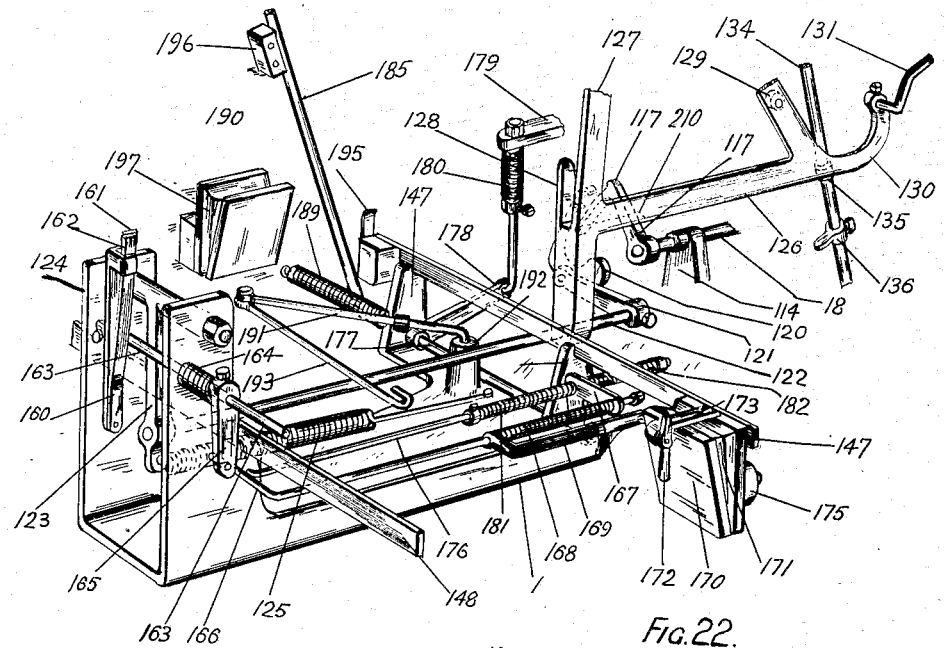

Fig. 22 an enlarged perspective view of part of the apparatus with record magazine removed.

Figure 23:
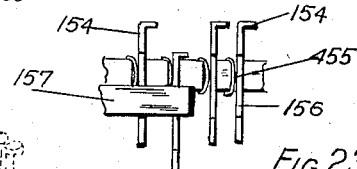

Fig. 23 detail view of registering keys.

Figures 24, 25:
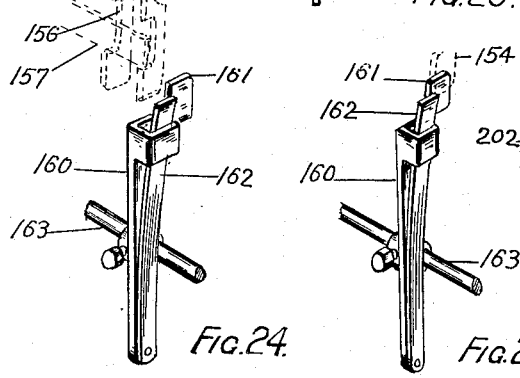
Figure 26:
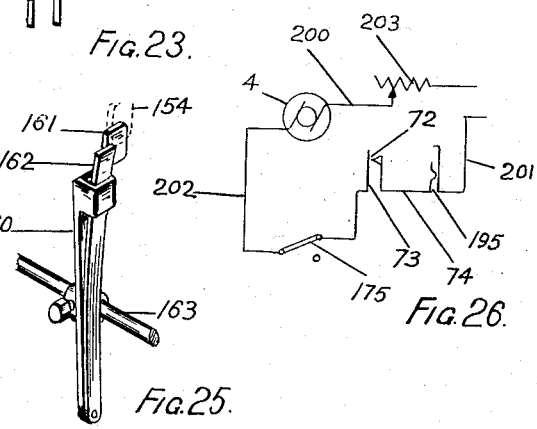

Figs. 24 and 25 are perspective views illustrating the action of releasing means which control the record magazine; and Fig. 26 a diagrammatic view of electrical circuit of the apparatus.

The bed plate 1 of the apparatus supports a pillar 2 carrying a bracket 3 bearing the electric motor 4 which has a driving pulley 5 with which is connected an endless resilient belt 6; the latter passes over the pulley 7 rigidly secured to the record turntable 8 (see Figs. 3 and 16). Such pulley 7 is fixed to the spindle 9 controlled by a speed governor 10, and it has fixed thereto a pulley 11 with which is associated an endless resilient belt 12; such belt is connected to and drives the governor 13. The turntable 8 has usual felt covering 14 and a tapered opening 15 to receive the spring controlled centering pin 16 which is carried on a radial arm 17 loosely mounted on the oscillating horizontal shaft 18. Radial arm 17 is operatable by a lug 19 (see Fig. 17) on a bell crank lever 20 rigidly secured to the oscillating shaft 18; said bell crank lever 20 is actuated by the governor 13.

Bell crank lever 20 carries a pivotal cup bearing 21 (see Figs. 3, 13, and 17) which is provided with a ball bearing 22 for the tapered end 23 of a telescopic pin 24, slidable in the lower end of the vertical spindle 25 and adapted to abut a coil spring 26 located within the vertically disposed spindle 25; on the latter is a fixed lug or pin 44 adapted to engage with the recess 27 in a brake device 28 pivoted to a bracket 29 attached to the bell crank lever 20 and provided with a control spring 30 and set screw 31.

Said spindle 25 is partly screw-threaded on its exterior and is slidably mounted within the governor 13, which has a pair of weighted pivotal arms 32 loosely attached to the connecting rods 33 provided with adjustable nuts 34; the arms 32 are rigidly secured to the pendulums 35, each of which carries a rotatable spindle 36 provided with an externally screw-threaded roller 37. The rollers 37 are adapted to be brought into and out of engagement with the threaded spindle 25. Each pendulum 35 is adapted to abut a set screw 38 on the governor 13 for the purpose of preventing the screw threaded rollers 37 from bearing excessively on the threaded spindle 25. The governor 13 has a barrel 39 forming a pulley and the endless resilient belt 12 is associated with said barrel. Barrel 39 is fitted with an axle pin 40 journalled in a ball bearing 41 within the bracket 42 which is clamped to a fixed rod 43.

When the shaft of the electric motor 4 has been set in motion the governor 13 will be rotated through the endless belt 12 and the weighted arms 32 of the governor 13 will thus be operated to actuate the pendulums 35 and place the rollers 37 into engagement with the threaded spindle 25. The lug or pin 44 on the spindle 25 being, however, in engagement with the brake 28 prevents temporary turning of the threaded spindle 25, but as the governor 13 continues to rotate the spindle 25 will be forced downwardly, and the bell crank lever 20 will thus be actuated until it reaches its lowest position (see dotted position Fig. 13). During such action the coil spring 26 within the spindle 25 will be compressed and the lug or pin 44 will also be forced below the brake arm 28, whereby the spindle 25 will be freed from the brake 28 and allowed to rotate with the governor 13.

Upon disruption of the electrical circuit of the apparatus the electric motor 4 will become inoperative and the weighted arms 32 of the governor 13 acting under gravitation release the rollers 37 from engagement with the threaded spindle 25 and the bell crank lever 20 will be enabled to return to normal position through the action of the coil spring 113. In such movement the threaded spindle 25 is also returned to normal position in relation to the governor 13.

Associated with the base 1 is a tubular connection 45, one end of which is connected to the amplifier 46 (see Fig. 3) while the other end thereof is loosely connected to the tone arm 47; the latter has rigidly attached thereto a bracket 48 (see Fig. 12), which is pivotally supported on a fixed rod 49 carried in the bracket 50, which is adjustably secured to the base 1 by the clamping plate 51 and adjustable rod 52.

On the other end of the tone arm 47 is loosely attached a bracket 53 (see Figs. 7 and 10) which has secured thereto the sound box 54; the bracket 53 has a radial arm 55 to which one end of a connecting link 56 is loosely attached while the other end of the said link is loosely supported in the jaw 57 (see Fig. 12) of the block 58 which is slidable on the rod 49. Such block 58 is connected to the bell crank lever 20 by the link 59. The sound box bracket 53 has a pivotal spindle 61 to which is rigidly secured a bell crank lever 62 (see Figs. 7 and 10), one limb of which has a slotted opening through which passes a rod 63 hingably attached at one end to a lug 64 on the needle chute 65 through which used needles are dischargeable; said chute is rigidly attached to the tone arm 47 by the screw 66. The other limb of the bell crank lever 62 carries an insulated lug 67 having a kerf adapted to receive a metal leaf spring 68 (see Fig. 10) which is anchored between two insulated posts 69 and 70 mounted rigidly on the bracket 53. A second metal leaf spring 71 is associated with the spring 68 and is capable of making electrical contact with a fixed insulated electrical contact 72; to the latter is secured an electrical lead wire 73, and the electrical lead wire 74 is secured to the leaf spring 68.

The said rod 63 is provided with a pair of adjustable stops 75 and 76 for the purpose of engaging with the bell crank lever 62; when the stop 76 engages with the bell crank lever 62 the electrical circuit of the apparatus will be broken through contact 72 and when the other stop 75 on the rod 63 engages with the lever 62 the said circuit is again established through the contact 72. On the pivotal spindle 61 is rigidly affixed a spring arm 77 which is provided with an adjustable brush holder 78 having a brush 79 which is adapted to engage with the sound grooves of the talking machine or sound reproducing record. When a record has been played the needle of the sound box 54 works in the last groove of the record and as such groove is circular the needle is prevented from making further progress; but the brush 79 which is adapted to follow the needle in its movement over the record, will still continue in its movement until the spring arm 77 is operated, through which the bell crank lever 62 is actuated to break the electrical circuit of the machine through contact 72 when the motor 4 will cease to operate. The bell crank lever 62 and sound box bracket 53 are respectively provided with tension coil springs 80 and 81.

Stylus bar 82 of the sound box 54 carries on its outer end an open ended housing 83 into which is led the free end of a flexible tubing 84 whose other end is connected with the needle magazine 94—95. The housing 83 is designed to enable a needle 88 when it is admitted thereto to be held locked therein after the sharpened end of the needle has come into contact with a record to be played; when the needle enters the housing with its sharpened end directed towards the record to be played such end of the needle when it contacts with the record causes the needle to be tilted through contact thereof with the housing 83, whereby portions of its shank will be made to abut separate portions of the housing 83 and thus be held locked therein. The pressure of the record on the needle 88 during the playing of the record, and the needle 88 being in engagement with the housing 83, will ensure that the needle 88 will be locked in the housing 83 in proper playing position in relation to the record. The needle 88 may be of any suitable gauge. Loosely affixed to the sound box 54 is a radial arm 85 (see Figs. 8 and 9) having on its end a tube 86 with split ends capable of being separated to provide an opening 87 (Fig. 11). The tube 86 is constructed of spring steel bent to tubular formation the ends of the tube being normally sprung closed. When the sound box 54 is located in non-playing position the open top of the tube 86 is juxtaposed to the open end of the housing 83; upon a needle 88 from the needle magazine 94—95 passing down the tubing 84 and into the housing 83 its pointed end will enter and rest in the tube 86 (see Figs. 8 and 9). As the sound box 54 is being moved into playing position the tube 86 and housing 83 move together carrying the needle 88; during such movement the spring finger 89, which is secured to the sound box 54, passes between the tube 86 and the housing 83 and holds the needle 88 firmly in position in housing 83; when the tube 86 strikes against the record 91 (see Fig. 9), the slight impact of the tube 86 against the record 91 will cause the tube 86 to return to normal against the adjustable stop 90, and during such movement the needle 88 will force the opposing ends of the tube 86 apart whereby the pointed end of the needle 88 will be brought into operative contact with the playing face of the record. Upon the record 91 having been played and while the sound box 54 is returning to normal position, the spring finger 89 will strike against the V-shaped recess 92 (Fig. 7) in the bracket 93 affixed to the needle chute 65 and thus the spring finger 89 will be released from the needle 88 and the latter is then enabled to fall through the needle chute 65, clear of the apparatus when the needle has been brought into contact with the tube 86 which has previously returned to normal position against the stop 90.

A needle magazine (see Figs. 4, 5 and 6) is provided in connection with the apparatus; such magazine consists of two compartments 94 and 95, one for soft tone needles and the other for loud tone needles; said compartments are mounted on an inclined base plate 96 secured to a bracket 97 which is rigidly affixed to the rod 43 firmly attached to the electric motor carrying bracket 3. The compartments 94 and 95 have a plurality of louvred partitions 99 adapted to prevent the needles from gathering at the delivery end of the compartments. In the bottom of the said compartments 94 and 95 and slidably mounted on the base plate 96 are a pair of sliding plates 100 and 101, each having through openings 102, adapted to accommodate a single needle 88. Each of the openings 102 is adapted to register with a through opening 103, with V-shaped or tapered ends, in the base plate 96, and located above the chutes 104. Such chutes are rigidly affixed to the base plate 96 and are open to the flexible tube 84, connected to the chutes at one end and at the other end connected to and in communication with the housing 83 of the stylus bar 82. The openings 103 are specially shaped to ensure that the needles 88 entering such openings will pass into the chutes 104 and also into the tube 84 with the point of the needle in forward position. Through movement of the slides 100 and 101 needles 88 located in the compartments 94 and 95 are agitated therein and such needles are thus regularly and evenly fed from said compartments to the slots 102 and from thence to the openings 103.

Sliding plates 100 and 101 are only operable separately through the bell crank lever 106 which is slidably mounted on the rod 107 fixed to the bracket 97; the lever 106 is adapted to engage with one of the recesses 108 in the sliding plates 100 and 101 before either of said plates can be operated. Such action is accomplished by manually sliding the plate 109 which has a through opening 110 for one limb of the bell crank lever 106 to pass through, and plate 109 can only be moved when a record is being played on the machine, as both sliding plates 100 and 101 are then in backward position. The bell crank lever 106 is operated by the connecting rod 111 (see Figs. 4 and 12) which is resiliently connected to the radial arm 112 which is rigidly attached to the oscillating shaft 18, the arm 112 being provided with a tension coil spring 113. Such oscillating shaft 18 is journalled in brackets 114; firmly affixed to one end of the shaft 18 is a radial sector shaped arm 116 (see Figs. 17 and 20) having a projection 117 which is adapted to engage with either the shoulder 118 or the curved end 119 of a weighted lever 120 according to the size of record about to be played. The weighted lever 120 is pivotally mounted on the arm 121 which is rigidly attached to the horizontal rod 122 secured to the bracket 123 pivotally mounted in the bracket 124 and provided with a coil spring 125.

Rod 122 supports the platform 126 (see Fig. 18) upon which a record 91 is placed from the magazine carriage 151 before said record is secured to the turntable 8. The platform 126 has a vertical wall 127, guide 128, and stops 129 and 210 against which a record may abut to position the record in relation to the turntable 8; it also has a lug 130 for the inclined element 131 which acts as a rest for the tone arm 47 when same is out of action, the element 131 engaging with the projection 132 on the needle chute (see Figs. 7 and 12). In the platform 126 is a recess 133 (see Figs. 3 and 12) through which passes a vertical rod 134 provided with two stop pieces 135 and 136 and upon which the platform 126 is adapted to rest according to the size of the record to be played. The lower end of the rod 134 is pivotally connected to a bell crank lever 137, (Fig. 12) which is pivotally mounted on a bracket 138 while the upper end of the rod 134 engages with a guide 139 (Fig. 18) on the bracket 140 secured to the motor bracket 3; on the upper end of the rod 134 is a projecting arm 141 against which larger sized records 91× are adapted to strike when they are about to be placed in playing position on the platform 126. Such action enables the rod 134 to be moved and the stop 135 made clear of the platform 126 and the latter with the larger record thereon is thus allowed to fall upon the lower stop piece 136, whereby such larger record can be positioned centrally over the turntable 8. The bell crank lever 137 (see Fig. 12) has a regulating set screw 143, and connected to one limb thereof is the horizontal rod 144, which passes through an opening in the tone arm bracket 48, and is fitted with an abutment nut 145 and a coil spring 146. The coil spring 146 is provided for the purpose of permitting the tone arm 47 to be placed in playing position in regard to the record. When the rod 134 is depressed through the platform 126 having been depressed through the operation of the lever 120 by the sector arm 116 on the shaft 18, to free the record from contact with the platform 126, the spring 146 is compressed, and the tone arm 47 with its sound box 54 is thus brought into playing position. When a small record has been played and a larger record has been fed to the platform 126 and the latter has been depressed as before described, and the rod 134 has been moved to allow the platform to fall onto the stop 136, the stop 131 is thus lowered to allow the tone arm to move to accommodate the difference in diameter of the smaller and the larger records.

Brackets 124 and 147 (see Figs. 18 and 22) support a pair of parallel horizontal rails 148 for the grooved rollers 149 loosely mounted upon the fixed axles 150, which support a magazine carriage framing 151 for a series of records. The carriage 151 has a plurality of narrow compartments 152 to accommodate both large and small records 91× and 91 respectively, and said compartments have an inwardly inclined bottom 153 the records being adapted to rest against a pad 155. Said carriage 151 is provided with an index card 194, containing the titles or other indicia of the various records, and a plurality of keys 154 one for each record; such keys are slidably mounted on the carriage 151 and are provided with tension springs 455 (see Fig. 23). Adapted to engage in the recesses 156 of the keys 154 is a cancellation bar 157 which is pivotally mounted on the carriage framing 151 and provided with an operating handle 158; the bar 157 is provided for the purpose of returning depressed keys 154 to normal position after completion of a selected programme of records. The magazine carriage 151 is connected to a power spring 189 by means of a radial link 191 pivoted in bracket 192; said link has coupled thereto one end of the power spring 189 whose other end is anchored to the back wall 190 (Fig. 22) of the cabinet. The radial link 191 is also connected to the carriage 151 by the hook member 193 one end of which is coupled to one of the spindles 150 of the carriage 151 and the other end thereof to the link 191. On one end of one of the rails 148 is an electrical switch 195 operatable through the carriage 151 when it is in normal backward position, whereby the electrical circuit of the apparatus is broken.

A releasing catch 160 is adapted to engage with the keys 154 which are depressed, such catch consisting of a fixed tooth 161 and a spring tooth 162. The catch 160 is rigidly mounted on a pivotal rod 163 slidably mounted in the bracket 124 and provided with a cushion spring 164 adapted to take the shock when a key 154 strikes against the release catch 160; the rod 163 is operated by a radial arm 165, having a connecting rod 166, which passes freely through an opening in another radial arm 167, fixed to the oscillating shaft 177, and terminates with an adjustable striking collar (see Fig. 17). A coil spring 168 threaded over the rod 166 abuts at opposite ends respectively against the radial arm 167 and against one end of a bracket link 169 (see Fig. 22), secured at that end of the rod 166 and pivotally connected at its other end to the hinged member 170 of a pneumatic control device 171. The pneumatic control device 171 is placed out of action by operating the hand lever 172 which is pivotally mounted on the bracket 173 affixed to the said control device; the object of placing the pneumatic control device 171 out of action is for the purpose of enabling a record to be repeated. Said pneumatic control device 171 supports an electric switch 175 adapted to allow starting or stopping of the apparatus.

Loosely anchored to the bracket 124 is a horizontal rod provided with buffer coil springs 181 and 182 (see Figs. 1 and 22) located respectively on opposite sides of the radial arm 167. The radial arm 167 is rigidly affixed to the horizontal shaft 177 having bearings in brackets 147, and provided with a radial arm 178 which is resiliently connected through coil spring 180 with an extension arm 179 forming an integral part of the bell crank lever 20. Horizontal shaft 177 carries a vertical arm 185 provided with a pair of segmental shaped ejector arms 186 having grooved rollers 187 at their extremities, the said rollers 187 being adapted to engage with a record. Affixed to the cabinet wall 190 (Fig. 22) is a stop piece 196 for the vertical rod 185 and also a pneumatic buffer 197 for the magazine.

In operation, assuming that the magazine 151 has been provided with records, a needle has been positioned in the housing 83, the magazine has been drawn outwardly against the tension of the spring 189, and the necessary keys 154 have been depressed opposite the records required to be played, the magazine 151 will be held in the outward position thereof by the spring tooth 162 of the releasing catch 160 engaging with one of the depressed keys 154. When the magazine 151 has been drawn outwardly the switch 195 (see Figs. 21 and 26) will be closed thereby; upon manual operation of the switch 175 the electrical circuit of the apparatus will be completed whereby current will be available through rheostat 203 and lead 200 to motor 4. lead 202, switch 175, lead 73 to contact 72, lead 74 to switch 195 and return wire 201.

Upon completion of the electrical circuit the shaft of the motor 4 will be set in motion and through the belt 6 the turntable 8 will be rotated as well as the pulley 11, whereby motion will be given to the governor 13. When the governor 13 is rotated the weighted arms 32 being thus operated will bring the threaded rollers 37 into engagement with the spindle 25 and through the operation of said spindle 25 actuation of the bell crank lever 20 will be effected together with the arm 179 which operates the horizontal shaft 177 carrying the ejector arms 186 and a record (say a small one 91) will be ejected from the magazine 151 onto the platform 126 and against the stop 129; meanwhile the platform 126 will be resting on the stop 135. During the final portion of the movement of the shaft 177, the radial arm 167 comes into contact with the striking collar on rod 166, whereby this rod and consequently the releasing catch 160 are actuated to remove the spring tooth 162 from the detaining magazine key 154 and interpose the fixed tooth 161; in this movement the pneumatic device 171 closes freely under the thrust of the link 169. Such operation of the bell crank lever 20 permits actuation thereby in the meantime of the shaft 18 to lift the radial arm 17 with its centering pin 16, to enable said pin to pass through the central opening of the record 91 and to enter the tapered opening 15 of the turntable 8. The record 91 will thus be placed centrally on the turntable 8 and be firmly held against same by the coil spring 206. (See Fig. 16).

The spindle 25 of the governor 13 will now be free of the brake 28, and the platform 126 will be slightly depressed through the lug 117 on sector arm 116 engaging with the shoulder 118 on the weighted lever 120 on the arm 121 of rod 122. Record 91 is thus freed for playing without contacting with the platform 126; simultaneously said platform 126 will depress the rod 134, the bell crank lever 137 will be thereby operated and the tone arm 47 placed in playing position. Further the bell crank lever 20 through link 59 will simultaneously slide outwardly the block 58 on the rod 49 whereby the link 56 will be operated and actuate the sound box bracket 53 to place the sound box 54 with a needle 88 in position in engagement with the record. During the said movement of the tone arm and sound box to place them into playing position the rod 111 will also actuate the bell crank lever 106 and draw the slide 101 inwardly ready to receive a new needle in the slot 102.

When playing of the record 91 has been finished the needle 88 will remain in the circular groove of the record whereby further movement of the tone arm 47 will be prevented and the brush 79 will be fed towards the needle 88 through the hairs thereof engaging in the sound grooves of the record and the spring 77 will be thus acted upon to actuate the bell crank lever 62 and consequently cause the electrical circuit at contact 72 to become broken. Upon such interruption of electrical circuit the motor 4 and the governor 13 will cease to operate and the weighted arms 32 of the governor 13 will fall inwardly; the rollers 37 will thus be freed from engagement with the spindle 25 and said spindle together with the bell crank lever 20 will be returned to normal position by the coil spring 113 operating the crank arm 112 on the oscillating shaft 18. The tone arm 47 will also be returned to normal position by the coil spring 207 (see Figs. 1 and 12) as well as the sound box 54, through the spring 81.

As the sound box 54 is returning to normal position the spring finger 89 will be released from the used needle 88 and said needle on striking the tube 86 will fall down the chute 65. The stop 76 (see Fig. 10) on the rod 63 will engage with the bell crank lever 62 and re-establish contact 72 and allow the brush 79 to resume normal position, but re-establishment of the contact 72 is not effected until the played record has been returned to the magazine 151.

Record 91 is also released from the turntable 8 through the centering pin having been withdrawn therefrom and the record is thus allowed to rest on the platform 126, the latter being returned to normal through the spring 125. The record is then removed from the platform 126 by the ejector arms 186 having been actuated by the bell crank lever 20 and connecting means, and the record is thus replaced in its original compartment on the magazine 151.

To prevent the release catch 160 operating before the used record is returned to position in the magazine 151, action of the rod 166 in its return stroke is retarded through the link 169 and pneumatic device 171. Thus the radial arm 167 merely compresses the spring 168, but by the time that the record has been returned to the magazine 151, the pneumatic will have completed its slow opening movement; consequently the release catch 160 will be free of the depressed key 154 opposite said record, and the coil spring 189 will operate the magaizne 151 backward until the next depressed key 154 engages with the spring tooth 162. Contact 72 will then have been reestablished and the succeeding record 91 to be played is then ready to be ejected from the magazine 151 to playing position thereof. As a record is being returned to the magazine 151 the rod 111 will actuate the bell crank lever 106 and operate the slide member 101 and discharge a new needle into the tube 84 to pass to the housing 83 and to enter the tube 86.

Assuming that a large record $91_x$ is to be played, it is ejected from the magazine 151 as before described onto the platform 126 and eventually strikes the projection 141 and operation of the rod 134 effectuated to free the platform 126 from the stop 135 to enable it to fall onto the stop 136. When the record $91_x$ has been centered and placed against the turntable 8, the lug 117 of the sector lever 116 will engage with the turned end 119 of the lever 120 to free the platform 126 from engagement with the record, otherwise the operation of the mechanism is identical with that before described.

When the last record has been played the magazine 151 returning to normal position will contact with the pneumatic buffer 197 and operate the switch 195 thereby opening the electrical circuit of the apparatus.

If loud tone needles are carried in the compartment 95 and soft tone needles in the compartment 94, to enable a soft needle to be used both slides 100 and 101 will need to be in the rearward position thereof and both recesses 108 in alignment to allow the slide 109 to be operated to slide the bell crank lever 106 along rod 107 into engagement with the recess 108 on slide 100 of chamber 94. Change of loud tone needles to soft tone needles can only be effected while a record is being played on the apparatus.

When a record is to be repeated the lever 172 is placed in horizontal position thereof, to put the pneumatic device 171 out of action and to compress the spring 168 by means of bracket 169, whereby the radial arm 167 will be prevented from operating the rod 166 to release the catch 160; the record must, however, be replaced in the magazine 151 each time its repetition is required to allow the used needle to be discharged and a fresh needle inserted.

In case the needle magazine 94—95 is empty of needles, and no needle has been fed to the sound box 54, although a record has been positiond on the turntable 8, the absence of the needle will allow the stop 76 on the rod 63 to operate the bell crank lever 62 and thus electrical contact 72 will be broken and the machine will not operate.

The ejector arms 186 are controlled in their arcuate movement by the coil springs 181 and 182 on rod 176.

What I claim as my invention and desire to secure by Letters Patent is:—

1. Sound reproducing apparatus comprising a vertically-positioned turntable, a reproducer associated with the turntable, a vertically-positioned magazine for records adjacent said turntable, an arm adapted to engage a record to roll the same on edge from the magazine to a playing position on the turntable, said arm engaging the record throughout its entire travel from the magazine to the turntable, and means for moving the reproducer into contact with the record when in playing position on the turntable.

2. Sound reproducing apparatus comprising a vertically-positioned turntable, a reproducer associated with the turntable, a vertically-positioned magazine for records adjacent said turntable, an arm adapted to engage a record and to roll the same on edge from the magazine to a playing position on the turntable and to return the record to the magazine after the record has been played, and means for moving the reproducer into contact with the record when in playing position on the turntable.

3. Sound reproducing apparatus comprising a vertically-positioned turntable, a reproducer associated with the turntable, a vertically-positioned magazine for records adjacent said turntable, an oscillating arm extending above sa'd turntable and magazine and provided with means for engaging a record in the magazine and rolling the same on its edge to a position in front of said turntable, means for securing the record to the turntable, to rotate therewith, means for moving the reproducer into and out of contact with the record on the turntable, and means on the oscillating arm to engage the record after it has been released from the turntable and to return the same to the magazine.

4. Sound reproducing apparatus comprising a vertically-positioned turntable, a reproducer associated with the turntable, a vertically-positioned magazine for records adjacent said turntable, an oscillating vertically extending arm terminating above the said turntable and magazine and located therebetween, laterally-extending arms on the upper end of said oscillating arm terminating in members adapted to engage the periphery of a record in the magazine, means to oscillate said arm in one direction to engage a record in the magazine and to roll the same on edge to a position in front of said turntable, means for securing the record to the turntable to rotate therewith, means for moving the reproducer into and out of contact with the record on the turntable, means for releasing the record from the turntable after the playing operation, and means for oscillating the arm in the opposite direction to cause the arm to engage the released record and roll the same on edge from a position in front of the turntable to the magazine.

5. Sound reproducing apparatus comprising a vertically-positioned turntable, a reproducer associated with the turntable, a vertically-positioned magazine for records adjacent said turntable, a platform positioned in front of said turntable, means for rolling a record on its edge from said magazine onto said platform, means for securing the record to the turntable to rotate therewith, means for moving the platform out of contact with the record, and means for moving the reproducer into contact with the record when in playing position on the turntable.

6. Sound reproducing apparatus comprising a vertically-positioned turntable, a reproducer associated with the turntable, a vertically-positioned magazine for records adjacent said turntable, a pivotally mounted platform positioned in front of said turntable, means for rolling a record on its edge from said magazine onto said platform, means for securing the record to the turntable to rotate therewith, means for moving the platform about its pivotal mounting out of contact with the record, and means for moving the reproducer into contact with the record when in playing position on the turntable.

7. Sound reproducing apparatus comprising a vertically-positioned turntable, a reproducer associated with the turntable, a vertically-positioned magazine for records adjacent said turntable, a platform positioned in front of said turntable, means for rolling a record on its edge from said magazine onto said platform, means for securing the record to the turntable to rotate therewith, a supporting member associated with the platform, positive means for depressing said supporting member to release the platform from contact with the said record, and means for moving the reproducer into contact with the record when in playing position on the turntable.

8. Sound reproducing apparatus comprising a vertically-positioned turntable, a reproducer associated with the turntable, a vertically-positioned magazine for records adjacent said turntable, a pivotally mounted platform positioned in front of said turntable, means for rolling a record on its edge from said magazine onto said platform, means for securing the record to the turntable to rotate therewith, a supporting member onto which the platform descends under the weight of the record, positive means for depressing the platform about its pivotal mounting from contact with the record after the record has been secured to the turntable, and means for moving the reproducer into contact with the record when in playing position on the turntable.

9. Sound reproducing apparatus comprising a vertically-positioned turntable, a reproducer associated with said turntable, a vertically-positioned magazine for records adjacent said turntable, a movable platform adapted to receive records from the magazine and to position them relative to the turntable, means for securing the record to the turntable, a depressible shaft pivotally supporting the platform, a supporting member for the platform for normally retaining the platform in its upper position, positive means for depressing the platform out of contact with the record after the latter has been secured in position on the turntable, and means for moving the reproducer into contact with the record when in playing position on the turntable.

10. Sound reproducing apparatus comprising a vertically-positioned turntable, a reproducer associated with said turntable, a vertically-positioned magazine for records adjacent said turntable, a movable platform adapted to receive records from the magazine and to position them relative to the turntable, means for securing the record to the turntable, a depressible shaft pivotally supporting the platform at one end thereof, a depressible rod normally supporting the platform in its upper position, positive means for depressing the platform out of contact with the record after the latter has been secured in position on the turntable, and means for moving the reproducer into contact with the record when in playing position on the turntable.

11. Sound reproducing apparatus comprising a vertically-positioned turntable, a reproducer associated with said turntable, a vertically-positioned magazine for records adjacent said turntable, a movable platform adapted to receive records from the magazine and to position them relative to the turntable, means for securing the record to the turntable, a depressible shaft pivotally supporting the platform at one end thereof, a depressible rod having a stop piece which normally supports the platform in its upper position, positive means for depressing the platform out of contact with the record after the latter has been secured in position on the turntable, and means for moving the reproducer into contact with the record when in playing position on the turntable.

12. Sound reproducing apparatus comprising a vertically-positioned turntable, a reproducer associated with said turntable, a vertically-positioned magazine for records adjacent said turntable, a movable platform adapted to receive records of varying diameters from the magazine and to position them relative to the turntable, means for securing the records to the turntable, a depressible shaft pivotally supporting the platform at one end thereof, a depressible rod having upper and lower stop pieces, the upper stop piece normally supporting the platform in its upper position to support a record of predetermined diameter, a projection on said rod engaged by a record of greater diameter than the record of predetermined diameter to remove the upper stop piece from contact with the platform to permit the platform to rest on the lower stop piece, positive means for depressing the platform out of contact with the record after it has been secured in position on the turntable, and means for moving the reproducer into contact with the record when in playing position on the turntable.

13. Sound reproducing apparatus comprising a vertically-positioned turntable, a reproducer associated with the turntable, a vertically-positioned magazine for records adjacent said turntable, a movable platform adapted to receive records of varying diameters from the magazine and to position them coaxially with respect to the turntable, means for securing the records to the turntable to rotate therewith, means for moving the platform out of contact with the record when the latter is secured to the turntable, and means for moving the reproducer into contact with the record when in playing position on the turntable.

14. Sound reproducing apparatus comprising a vertically-positioned turntable, a reproducer associated with the turntable, a vertically positioned magazine for records adjacent said turntable, a movable platform adapted to receive records of varying diameters from the magazines, depressible stops adapted to selectively support said platform to position the records coaxially with respect to the turntable, one of said stops being adjusted for records of a predetermined diameter, means engaged by a record of greater diameter than the record of predetermined diameter to remove the first stop from contact with the platform to permit said platform to rest on another of said depressible stops adjusted for records of greater diameter, means for securing the record to the turntable to rotate therewith, positive means for depressing the platform out of contact with the record after the latter has been secured to the turntable, and means operated by the depression of the platform and the depressible stop on which it rests for moving the reproducer into contact with the record when in playing position on the turntable.

15. Sound reproducing apparatus comprising a vertically-positioned turntable, a reproducer associated with the turntable, a vertically-positioned magazine for records adjacent said turntable, a movable platform pivotally mounted at one end thereof adapted to receive records of varying diameters from the magazine, a depressible rod having spaced stops adjustable on the rod and adapted to support the free end of said movable platform and to position the selected records of varying diameters coaxially with respect to the turntable, means on the rod engaged by the record to remove the stops adjusted for a record of predetermined diameter from contact with the platform to support the platform on that stop adjusted on the rod to accommodate a record of a diameter greater than that supported by the platform on the previously-mentioned stop means for securing the selected record to said turntable to rotate therewith, means for moving the platform out of contact with the record when the latter is secured to the turntable, and means for moving the reproducer into contact with the record when in playing position on the turntable.

16. Sound reproducing apparatus comprising a vertically-positioned turntable, a reproducer associated with the turntable, a magazine positioned adjacent said turntable and adapted to contain a plurality of records supported in vertical position therein, a platform positioned in front of said turntable, means for moving the magazine to bring a selected record in alinement with the platform, means for rolling the selected record on its edge from said magazine onto said platform, means for securing said record to said turntable, means for moving the platform out of contact with the record, and means for moving the reproducer into contact with the record when in playing position on the turntable.

17. Sound reproducing apparatus comprising a vertically-positioned turntable, a reproducer associated with the turntable, a magazine positioned adjacent said turntable, said magazine being open on the side facing the turntable and being divided into compartments each adapted to contain a record, a selector key for each compartment arranged on the side of the magazine remote from the turntable, means for moving the magazine to bring the selected compartment into alinement with the turntable, means for rolling the record on its edge from the selected compartment to a position in front of the turntable, means for securing said record to the turntable to rotate therewith, and means for moving the reproducer into contact with the record when in playing position on the turntable.

18. Sound reproducing apparatus comprising a vertically-positioned turntable, a reproducer associated with the turntable, a magazine adjacent said turntable and comprising a series of vertical compartments each adapted to contain a record, means for moving the magazine in a plane parallel to the axis of the turntable to progressively bring selected compartments into alinement with the turntable, means for rolling the selected record on its edge from its compartment to a position in front of the turntable, said means engaging the record throughout its entire travel from the magazine to a position in front of the turntable, means for securing said record to the turntable and for reproducing the record, means to return the reproduced record to its compartment, said means engaging the record throughout its entire travel from the turntable to the compartment, and means for moving the magazine to bring the next selected compartment into alinement with the turntable.

19. Sound reproducing apparatus comprising a vertically-positioned turntable, a reproducer associated with the turntable, a pair of spaced parallel tracks adjacent said turntable and extending in planes parallel to the axis of the turntable, a magazine adapted to move back and forth on said tracks and comprising a series of vertical compartments each adapted to contain a record, a depressible selector key for each compartment adapted to stop the movement of the magazine to bring the selected record compartment into alinement with the turntable, means for rolling the selected record on its edge from its compartment to a position in front of the turntable, means for securing said record to the turntable and for reproducing the record, means for returning the reproduced record to its compartment, means for moving the magazine along the tracks to a position determined by the depression of the next selector key to position the next selected compartment into alinement with the turntable, and means for delaying the operation of said last mentioned means until after the return of the reproduced record to its compartment.

20. Sound reproducing apparatus comprising a vertically-positioned turntable, a reproducer associated with the turntable, a magazine positioned adjacent said turntable and comprising a series of vertical compartments each adapted to contain a record, an independently depressible selector key for each compartment adapted to control the position of the compartment with respect to the turntable, rockable stop means for separately engaging and releasing the said keys when the latter have been depressed, means for actuating the rockable stop means, means for moving the magazine to bring a depressed key into engagement with the rockable stop means and hence the selected compartment into alinement with the turntable, means for rolling the record on its edge from said compartment to a position in front of the turntable, means for securing said record to the turntable, and means for moving the reproducer into contact with the record when in playing position on the turntable.

21. Sound reproducing apparatus comprising a vertically-positioned turntable, a reproducer associated with the turntable, a magazine positioned adjacent said turntable and comprising a series of vertical compartments each adapted to contain a record, an independently depressible selector key for each compartment adapted to control the position of the compartment with respect to the turntable, each selector key having a recess therein, rockable stop means for separately engaging and releasing the said keys when the latter have been depressed, means for actuating the rockable stop means, a cancellation bar pivotally associated with the magazine and cooperating with the recesses in the depressible keys to return depressed keys to a normal inoperative position, means for moving the magazine to bring a depressed key into engagement with the rockable stop means and hence the selected compartment into alinement with the turntable, means for rolling the record on its edge from said selected compartment to a position in front of the turntable, means for securing said record to the turntable to rotate therewith, and means for moving the reproducer into contact with the record when in playing position on the turntable.

22. Sound reproducing apparatus comprising a vertically-positioned turntable, a reproducer associated with the turntable, a vertically positioned magazine for records adjacent said turntable and movable with respect to said turntable to aline a selected record with the turntable, means tending to return said magazine to a position of rest at one end of its movement, an electrical controlling and operating circuit, means for initially energizing said circuit including a switch closed by movement of the magazine from its position of rest, means to transfer a record from said magazine to said turntable where the record is reproduced, means to return the record from the turntable to the magazine, and means actuated by the magazine on its return to said position of rest to de-energize the controlling and operating circuit.

23. Sound reproducing apparatus comprising a turntable, a reproducer and tone arm associated with the turntable, a magazine for records adjacent said turntable and movable with respect to the turntable, an electrical controlling and operating circuit for the apparatus, means to transfer a record from said magazine to said turntable where the record is reproduced and to return the record from the turntable to the magazine after the reproduction, a brush associated with the reproducer and tone arm adapted to traverse the sound grooves of the record, a switch for opening the controlling and operating circuit, and a spring between said brush and said switch member actuated to open the circuit upon the completion of the reproduction.

24. Sound reproducing apparatus comprising a turntable, a reproducer and tone arm associated with the turntable, a magazine for records adjacent said turntable and movable with respect to the turntable, an electrical controlling and operating circuit for the apparatus, means to transfer a record from said magazine to said turntable where the record is reproduced and to return the record from the turntable to the magazine after the reproduction, a brush associated with the reproducer and tone arm adapted to traverse the sound grooves of the record, a switch for opening and closing the controlling and operating circuit, a spring between said brush and said switch, said brush operating by its continued travel over the sound grooves to open the said circuit through the action of said spring upon the completion of the reproduction, and means for re-establishing the circuit when the record has been returned to the magazine.

25. Sound reproducing apparatus comprising a turntable, a reproducer associated with the turntable, a magazine for records adjacent said turntable, an electric motor for driving the turntable, means for transferring a record from the magazine to the turntable, means for securing the record to the turntable and for bringing the reproducer into contact therewith to reproduce the record, an electric controlling and operating circuit for the motor, means for de-energizing the controlling and operating circuit upon completion of the reproduction, means for releasing the record from the turntable and returning the reproducer to normal position, means for transferring the released record from the turntable to the magazine, and means for reestablishing the electrical controlling and operating circuit simultaneously with the return movement of the record to the magazine.

26. Sound reproducing apparatus comprising a turntable, a reproducer associated with the turntable, a magazine for records adjacent said turntable, an electric motor for driving the turntable, a governor actuated by said electric motor, an electrical controlling and operating circuit for the motor, means actuated by the motor and controlled by the governor for transferring a record from the magazine to the turntable, for securing the record to the turntable to rotate therewith and to bring the reproducer into contact with the record to reproduce the same, means for de-energizing the electrical controlling and operating circuit upon the completion of the reproduction to cause the governor to become inoperative, means for releasing the record from the turntable, returning the reproducer to normal position and returning the record from the turntable to the magazine and means for reestablishing the controlling and operating circuit simultaneously with the return of the record to the magazine.

27. Sound reproducing apparatus comprising a turntable, a reproducer associated with the turntable, a magazine for records adjacent said turntable, an electric motor for driving the turntable, a governor actuated by said electric motor, an electrical controlling and operating circuit for the motor, means actuated by the motor and controlled by the governor for transferring a record from the magazine to the turntable, for securing the record to the turntable to rotate therewith, and for bringing the reproducer into contact with the record to reproduce the same, means for de-energizing the electrical controlling and operating circuit upon the completion of the reproduction to release the record from the turntable, return the reproducer to normal position and return the record from the turntable to the magazine, and means associated with the governor whereby the operation of the turntable, record transfer device and reproducer is dependent upon the operation of said governor through the electric motor.

28. Sound reproducing apparatus comprising a turntable, a reproducer associated with the turntable, a magazine for records adjacent said turntable and movable with respect said turntable to aline a selected record the turntable, an electrical controlling and operating circuit for the apparatus, means for initially energizing said circuit including a switch closed by movement of the magazine from its initial position, means to transfer a record from said magazine to said turntable where the record is reproduced, means adapted to be operated after the record has been reproduced to de-energize the controlling and operating circuit, means to return the reproduced record from the turntable to the magazine, and means to reestablish the controlling and operating circuit after the return of the reproduced record to the magazine, said switch being actuated by the magazine on its return to initial position to de-energize the said controlling and operating circuit.

29. Sound reproducing apparatus comprising a turntable, a reproducer and tone arm associated with the turntable, a magazine for records adjacent said turntable and movable with respect to said turntable to aline a selected record with the turntable, an electrical controlling and operating circuit for the apparatus, means for controlling said circuit including a switch closed by movement of the magazine from its initial position and a switch associated with the reproducer and tone arm, means to transfer a record from said magazine to said turntable where the record is reproduced, means controlled by the completion of the reproduction to actuate the switch associated with the reproducer and tone arm to de-energize the controlling and operating citrcuit, means to return the reproduced record from the turntable to the magazine, and means to re-establish the controlling and operating circuit after the return of the reproduced record to the magazine, said switch closed by movement of the magazine from its initial position being actuated by the magazine on its return to initial position to de-energize the said controlling and operating circuit.

In testimony whereof I affix my signature.

WILLIAM ROBERT OYSTON.